US008925935B2

(12) United States Patent  
Powers et al.

(10) Patent No.: US 8,925,935 B2
(45) Date of Patent: Jan. 6, 2015

(54) SCOOTER

(75) Inventors: Katherine Powers, Chicago, IL (US);
Cameron Eckert, Chicago, IL (US);
Emily Rivard, Chicago, IL (US); Todd Herlitz, Chicago, IL (US)

(73) Assignee: Radio Flyer Inc., Chicago, IL (US)

(*) Notice: Subject to any disclaimer, the term of this patent is extended or adjusted under 35 U.S.C. 154(b) by 0 days.

(21) Appl. No.: 13/486,909

(22) Filed: Jun. 1, 2012

(65) Prior Publication Data

US 2013/0049334 A1  Feb. 28, 2013

Related U.S. Application Data

(60) Provisional application No. 61/492,264, filed on Jun. 1, 2011.

(51) Int. Cl.
*B60M 1/00* (2006.01)
*B62K 3/00* (2006.01)
*B62K 15/00* (2006.01)

(52) U.S. Cl.
CPC .................. *B62K 3/002* (2013.01); *B62K 15/00* (2013.01)
USPC .................................. 280/87.041; 280/655.1

(58) Field of Classification Search
USPC ........................... 280/87.041–87.042, 11.16, 280/11.27–11.28, 39, 652, 87.05, 655.1
See application file for complete search history.

(56) References Cited

U.S. PATENT DOCUMENTS

| | | |
|---|---|---|
| D438,911 S | 3/2001 | Chen |
| D438,912 S | 3/2001 | Barrera |
| D439,623 S | 3/2001 | Barrera |
| 6,244,605 B1 * | 6/2001 | Liu .......................... 280/87.041 |
| D447,187 S | 8/2001 | Powers |
| D452,284 S | 12/2001 | McGinnis |
| 6,367,829 B1 * | 4/2002 | Lee ............................ 280/87.05 |
| D547,388 S | 7/2007 | Thomas et al. |
| D581,991 S | 12/2008 | Armand et al. |

* cited by examiner

*Primary Examiner* — John Walters
*Assistant Examiner* — James Triggs
(74) *Attorney, Agent, or Firm* — McDermott Will & Emery LLP

(57) ABSTRACT

A scooter features a deck tube with a steering column having a front wheel and handlebars are pivotally attached to a leading portion of the deck tube by a steering column. A rear wheel attached to a trailing portion of the deck tube. A deck features a channel portion that receives the deck tube so that the deck is supported on the deck tube. Interlocking decorative clips are removably positioned on the steering column, and each features a generally C-shaped body constructed from a semi-rigid material.

18 Claims, 7 Drawing Sheets

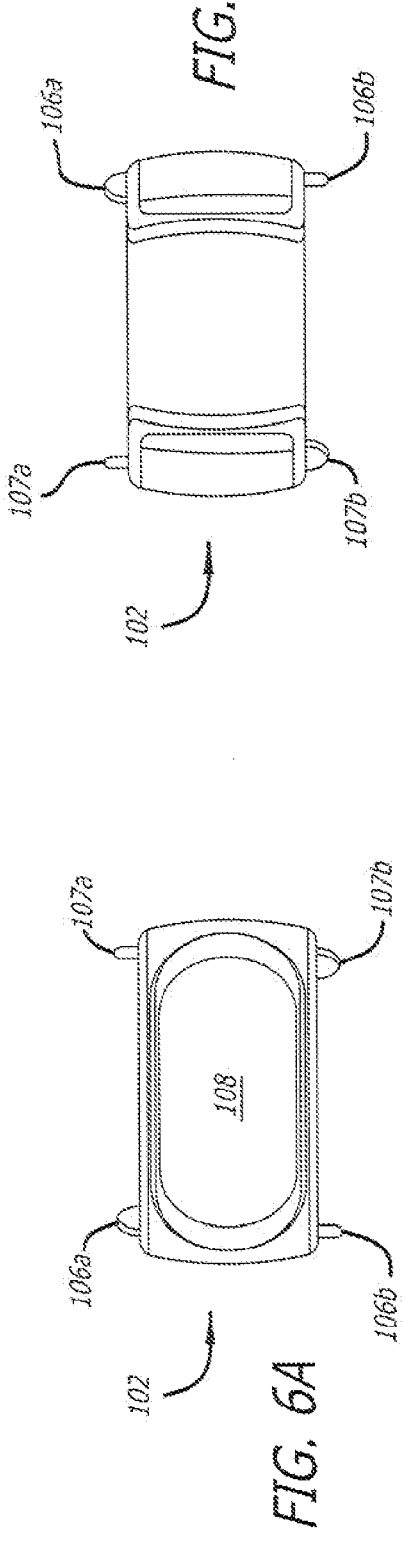
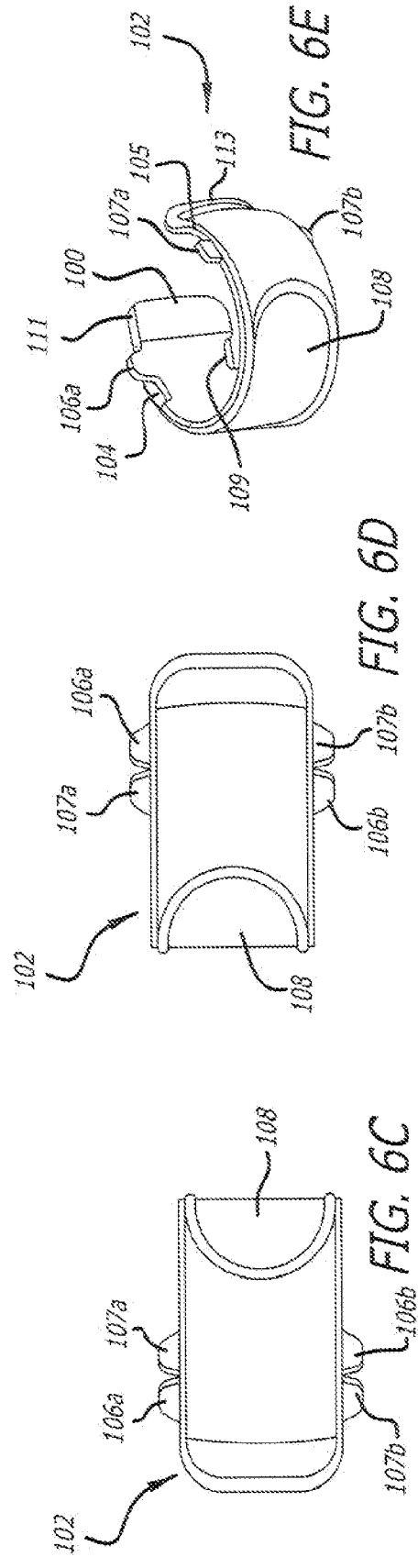

US 8,925,935 B2

SCOOTER

CLAIM OF PRIORITY

This application claims priority to U.S. Provisional Patent Application Ser. No. 61/492,264, filed Jun. 1, 2011, the contents of which are hereby incorporated by reference.

FIELD OF THE INVENTION

The present invention relates to scooters and, more particularly, to the construction and decorative features of a scooter.

BRIEF DESCRIPTION OF THE DRAWINGS

FIGS. 6A-6E provide front, rear, right side and left side elevation and perspective views, respectively, of one of the decorative clips of the scooter of FIG. 1;

DETAILED DESCRIPTION OF EMBODIMENTS

Figure 1:
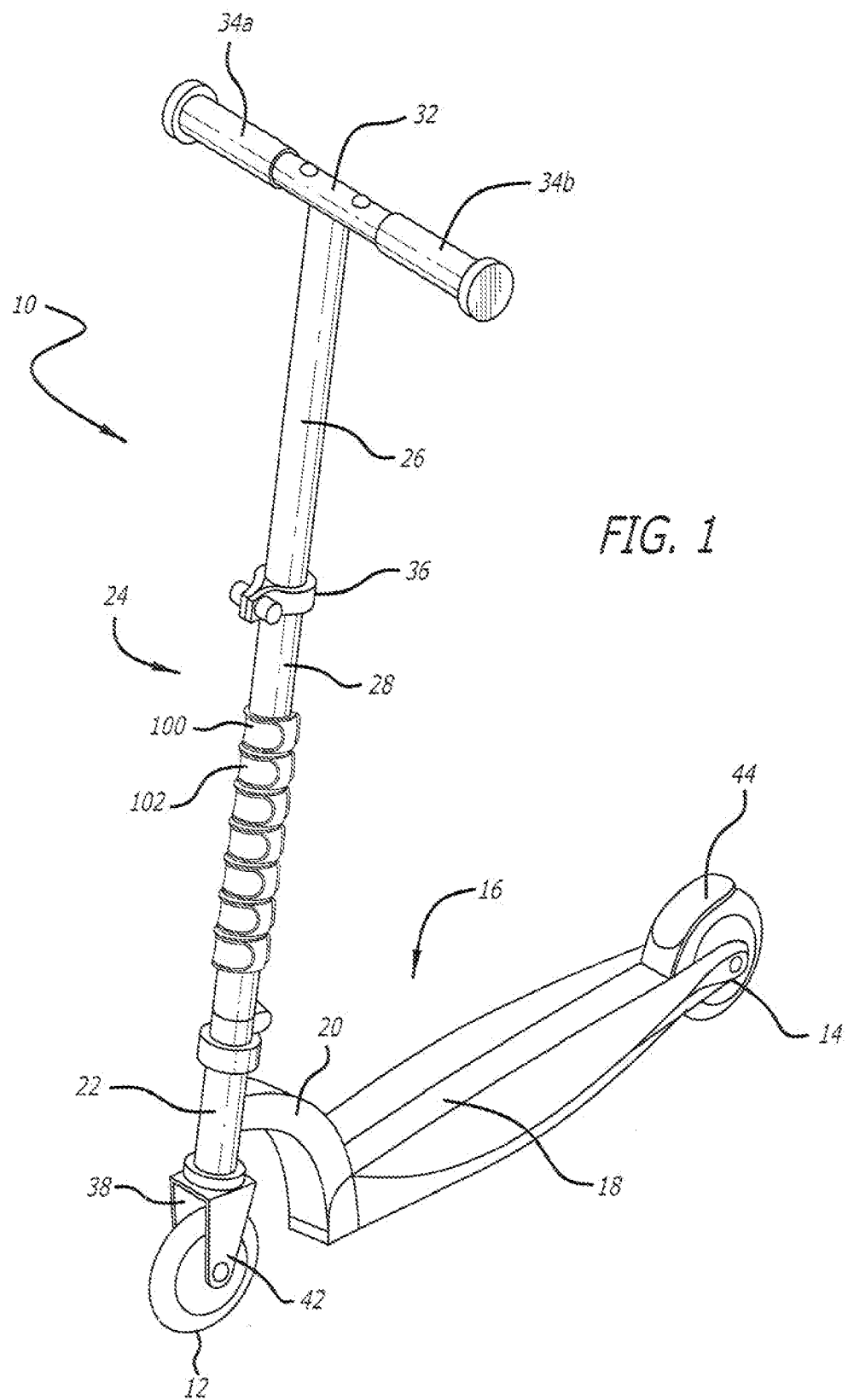
FIG. 1 is a perspective view of an embodiment of the scooter of the present invention.

An embodiment of the scooter of the present invention is indicated in general at 10 in FIG. 1. The scooter features a front wheel 12 and a back wheel 14 that support a riding platform, indicated in general at 16. As will be described in greater detail below, the riding platform includes a deck tube 18 which is attached to a neck tube 20. A head tube 22 is attached to the leading end of the neck tube 20.

A telescoping steering column, indicated in general at 24, features an upper portion 26 and a lower portion 28. Upper portion 26 is received within lower portion 28 in a telescoping fashion so that handlebars 32, which feature hand grips 34a and 34b, may be positioned at a desired height. The upper portion 26 may be secured in the selected position with respect to the lower portion 28 by way of releasable clamp 36. A threaded collar or screw may be used in place of clamp 36 as the mechanism to lock telescoping steering column in the desired configuration.

The lower portion 28 of the steering, column is pivotally received with the head tube 22, and a front fork 38 is secured in a fixed fashion to the bottom end of the lower portion 28 of the steering column. The front fork 38 engages the axle 42 of the front wheel 12 so that the front wheel is free to rotate.

As will be explained in greater detail below, the rear wheel 14 is attached to the deck tube 18 in a rotating fashion. A rear fender 44 has a leading end that is secured to the deck tube 18. The rear fender is preferably constructed of plastic so that it may flex in a clockwise direction when engaged by the foot of a rider so that the interior surface of the trailing portion of the fender engages the rear wheel to serve as a brake for the scooter.

As is known in the art, a rider stands on the riding platform 16 and pushes with one foot to provide propulsion. The rider grasps hand grips 34a and 34b and pivots the steering, column within the head tube 22 to steer the scooter.

Figure 2:
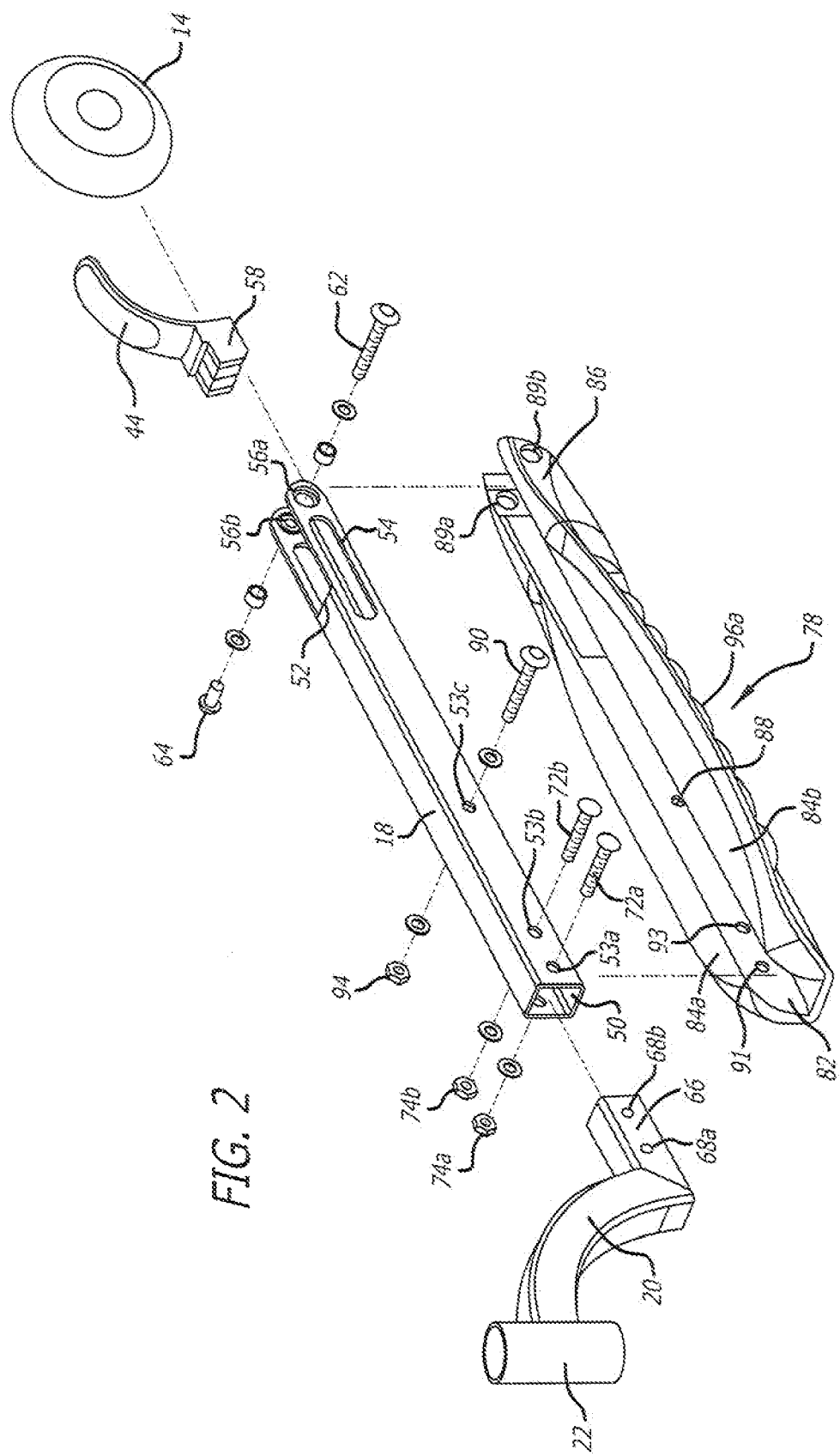
FIG. 2 is an exploded perspective view of the head tube, neck tube, neck linkage, deck, deck tube, rear fender and rear wheel of the scooter of FIG. 1.

Details regarding the construction of the riding platform and attachment of components there to are presented in FIG. 2. Deck tube 18 preferably is constructed from steel and features front opening 50 and rear opening 52. Deck tube 18 also features openings 53a, 53b, and 53c that pass clear through opposing sidewall portions of the deck tube.

Figure 3:
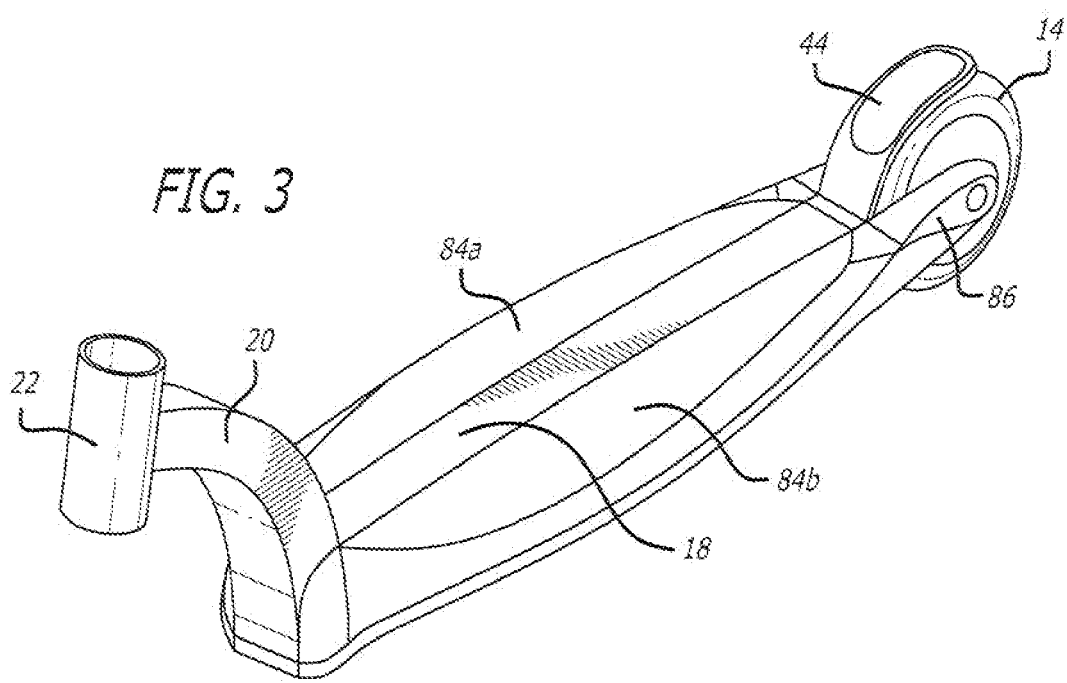
FIG. 3 is a perspective view of the assembled components of FIG. 2.
Figure 4A:
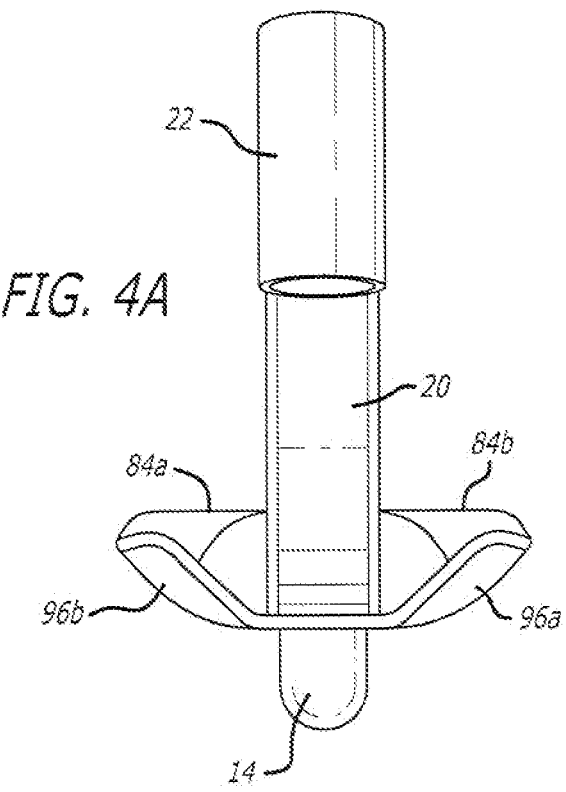
FIGS. 4A-4C provide front and right side elevation and bottom plan views, respectively, of the riding platform and other components of FIG. 3.
Figure 4B:
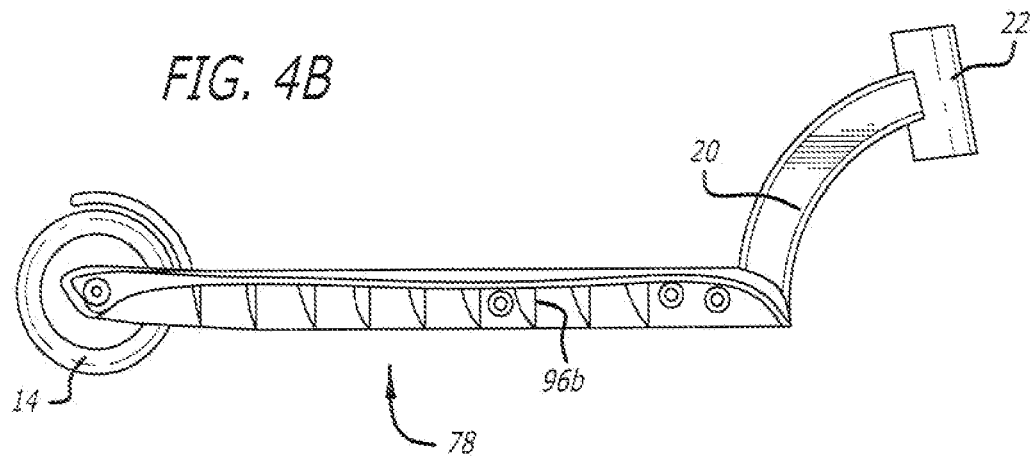
Figure 4C:
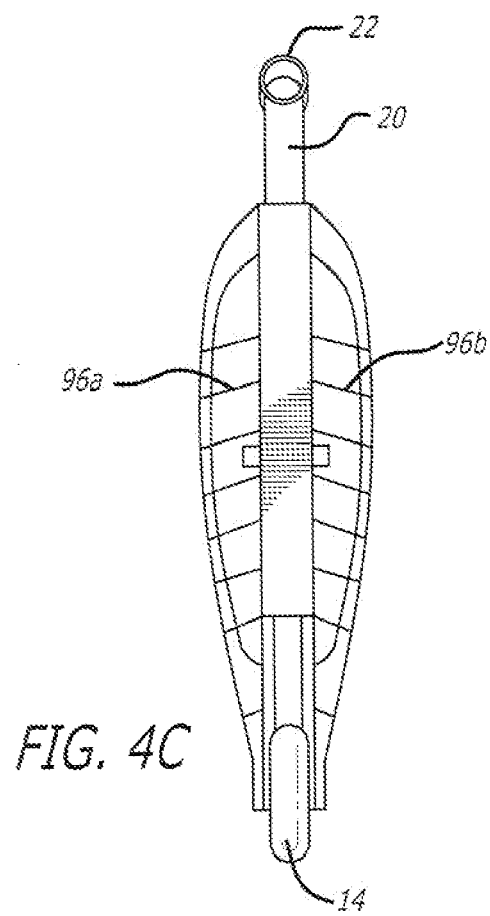

Rear wheel forks 54 are attached to the trailing portion of the deck tube and are provided with axle support openings 56a and 56b. Rear fender 44 features a plug 58 which engages the rear opening 52 of the deck tube to secure the leading end of the rear fender to the deck tube 18, as illustrated in FIGS. 1 and 3. As illustrated in FIGS. 1 and 3, the rear wheel 14 is rotatably positioned between the forks of rear wheel fork 54 via an axle 62 that passes through the center of the rear wheel 14 and axle support openings 56a and 56b. The axle 62 is preferably a female screw which is engaged by male screw 64.

The trailing end of neck tube 20 is provided with a neck linkage 66 which is received within the front opening 50 of the deck tube 18. The neck linkage 66 is provided with openings 68a and 68b. When the neck tube is positioned within the deck tube 18, openings 68a and 68b of the neck linkage are aligned with openings 53a and 53b of the deck tube. Fasteners 72a and 72b, which are preferably machine screws, pass through the aligned openings and are engaged by nuts 74a and 74b to secure the neck tube 20 and head tube 22 to the deck tube 18, as illustrated in FIGS. 1 and 3.

As illustrated in FIG. 2, the riding platform of the scooter is composed of the deck tube 18 and a deck 78. The deck 78, which is preferably-molded from plastic, includes a channel 82 and wings 84a and 84b. The deck also features a rear fork portion 86. The deck is provided with openings 88, 91 and 93, which pass entirely through opposing side wall portions of the deck, while fork portion 86 is provided with openings 89a and 89b. The channel 82 of the deck receives the deck tube 18, as illustrated in FIGS. 1 and 3, and the is secured in place by fasteners 72a and 72b, which pass through openings 91 and 93, respectively, of the deck and a fastener 90, which is preferably a machine screw, that passes through openings 88 of the deck and openings 53c of the deck tube. A nut 94 engages the fastener 90. The rear axle 62 also passes through openings 89a and 89b to secure the deck to the deck tube.

The underside of the deck, as illustrated in FIGS. 2 and 4A-4C, preferably features a number of support ribs 96a and 96b that support the deck wings 84a and 84b and provide strength to the deck.

Figure 5:
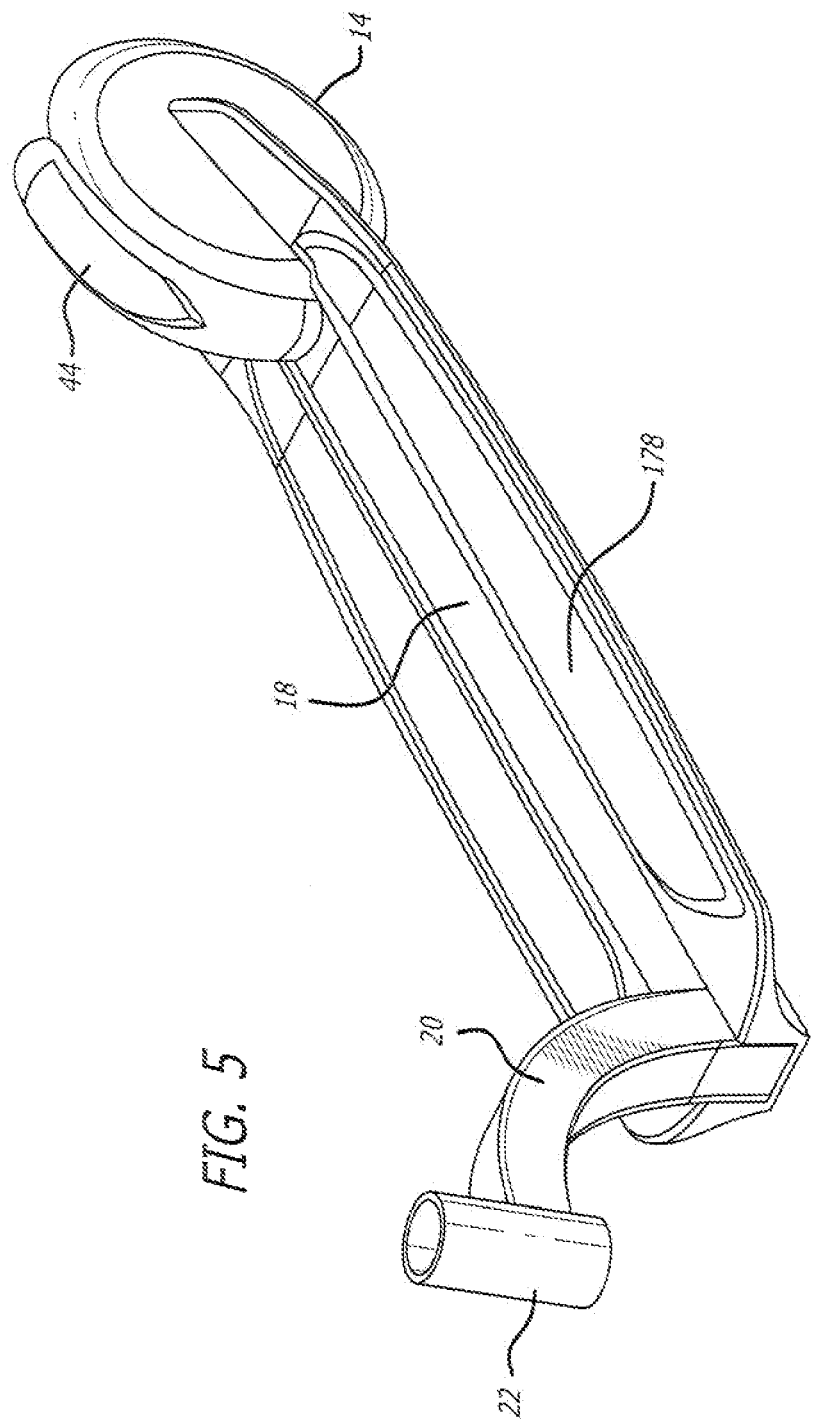
FIG. 5 is a perspective view of the assembled head tube, neck tube, neck linkage, deck, deck tube, rear fender and rear wheel of a second embodiment of the scooter of the present invention.

It should be noted that deck 78 may be constructed from a variety of materials including wood, aluminum and other metals and plastics. Furthermore, the deck may of course feature shapes other than the one illustrated in FIG. 2. As a result, the scooter may be provided with a variety of interchangeable decks which enables the appearance of the scooter to be changed easily and with little cost. This is a benefit in manufacturing as a different product may be made simply by using a new deck design (while the remaining components remain the same across product lines). For example, a second embodiment of the scooter of the invention illustrated in FIG. 5, features a different deck design, indicated at 178, while the remaining components are unchanged with regard to the embodiment of FIGS. 2-4C, and thus retain the same numbering.

Figure 9:
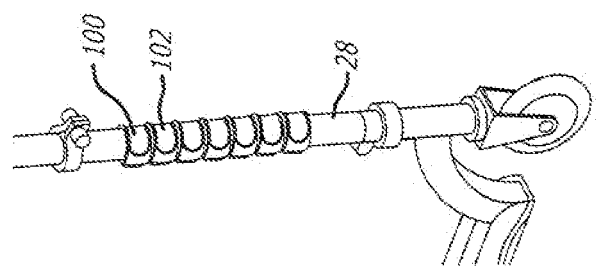
FIGS. 8-9 are perspective views illustrating installation of the decorative clips of FIGS. 6A-6E.
Figure 8:
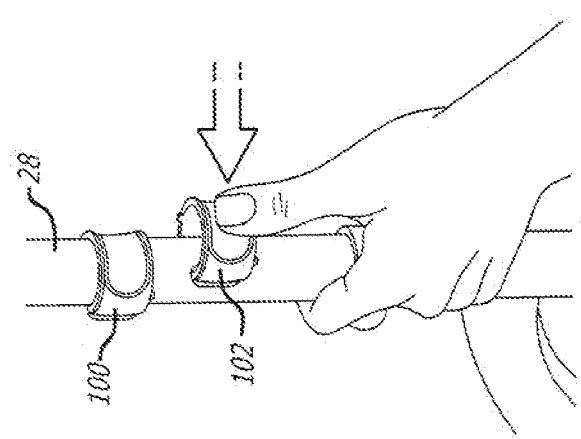

The scooter of FIG. 1 is also provided with a number of decorative clips, such as clips 100 and 102. Enlarged views of clip 102 are presented in FIGS. 6A-6E. Clip 100 and the remaining clips of FIGS. 1, 8 and 9 feature an identical construction. As illustrated in FIGS. 6A-6E, the clip 102 features a generally C-shaped body and is preferably constructed from semi-rigid plastic. As illustrated for clip 102 in FIGS. 7-9, each clip can be clipped onto the lower portion 28 of the scooter steering column for decorative purposes. As illustrated in FIG. 6E, each end of the clip body is provided with lips 111 and 113 to facilitate attachment of the clips to the scooter steering column or other elongated member.

Semi-rigid materials other than plastic may alternatively be used for the construction of the clips 100 and 102.

Figure 7:
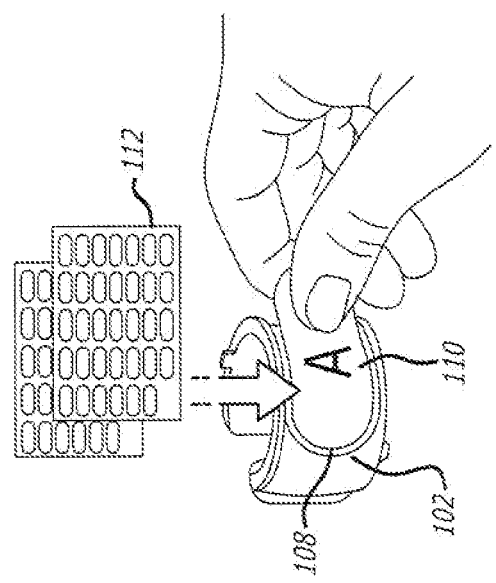
FIG. 7 is a perspective view illustrating installation of a sticker on the surface of the decorative clips of FIGS. 6A-6E.

As illustrated in FIG. 7, the surface of the clip is provided with an indentation 108 which is adapted to receive a sticker 110. As a result, a sheet of stickers 112 can be provided with the toy or purchased later to provide customization of the clip 102.

As illustrated in FIGS. 6A-6E, the clip 102 is provided with a first pair of upward and downward extending tabs 106a and 106b, and a second pair of upward and downward extending tabs 107a and 107b. As illustrated in FIG. 6E, recesses are positioned adjacent to each of tabs 106a, 106b, 107a and 107b in a staggered fashion. For example, corresponding recesses 104 and 105 are formed on the inner surface of the clip next to tabs 106a and 107a, while recess 109 is positioned adjacent to tab 106b (positioned to the left of tab 109 in FIG. 6E and thus not visible). As illustrated in FIGS. 6C and 6D, the clip is not symmetrical with regard to the first pair of tabs 106a and 106b and the second pair of tabs 107a and 107b, as well as the corresponding recesses 104, 105, 109 (and a fourth recess adjacent to tab 107b that is not visible).

With reference to FIG. 6E, when the clips are positioned on a steering column (in the manner illustrated in FIGS. 1 and 9) tab 106a of clip 102 engages a recess of a neighboring clip positioned above clip 102 that corresponds to recess 109 and tab 106b engages a recess of a neighboring clip positioned below clip 102 that corresponds to recess 104. Similar to tab 106b, tab 107b of clip 102 engages a recess of a neighboring clip positioned below clip 102 that corresponds to recess 105. Tab 107a engages a recess of a clip positioned above in the manner described for tab 106a. The resulting interlocking of the clips prevents rotation of the clips during use of the scooter. As a result, the chosen stickers placed in indentations 108 of the clips may always face the front of the scooter, or any other desired direction.

While the decorative clips are illustrated as attached to the steering column of scooter, they may be attached to any other elongated member (such as a frame member) of a vehicle to provide decoration and personalization of the vehicle for the rider.

While the preferred embodiments of the invention have been shown and described, it will be apparent to those skilled in the art that changes and modifications may be made therein without departing from the spirit of the invention, the scope of which is defined by the appended claims.

What is claimed is:

1. A scooter comprising:
   a) a deck tube;
   b) a steering column attached to a leading portion of the deck tube;
   c) a front wheel attached to the leading portion of the deck tube;
   d) a rear wheel attached to a trailing portion of the deck tube;
   e) a deck featuring a channel portion and a wing secured to the channel portion and adapted to support a rider, said channel portion receiving the deck tube so that the deck is supported on the deck tube, and wherein the channel portion of the deck features an open top through which the deck tube passes; and
   f) fasteners securing the deck to the deck tube.

2. The scooter of claim 1 further comprising a handlebar, a front fork, a head tube and a neck tube and wherein the handlebar is attached to the top of the steering column, the front fork is attached to the bottom of the steering column with the front wheel rotatably attached thereto, the steering column is received within the head tube in a pivoting fashion and the head tube is secured to the deck tube by the neck tube.

3. The scooter of claim 2 wherein the handlebar is telescopic.

4. The scooter of claim 1 wherein the deck is constructed of molded plastic.

5. The scooter of claim 1 wherein the deck includes a first wing and a second wing with the first wing positioned on one side of the channel portion and the second wing positioned on the other side of the channel portion.

6. The scooter of claim 1 wherein the wings of the deck include support ribs.

7. The scooter of claim 1 wherein the deck-features openings and the deck tube features corresponding openings through which the fasteners pass to secure the deck to the deck tube.

8. The scooter of claim 1 wherein the deck includes a rear fork portion with openings that receive a rear axle for the rear wheel of the scooter.

9. The scooter of claim 1 further comprising a rear fender having a leading end attached to the deck tube wherein the rear fender is made of plastic and is adapted to engage the rear wheel of the scooter when actuated by a rider to serve as a brake.

10. A deck for a scooter having a deck tube comprising:
    a) a channel portion;
    b) a wing secured to the channel portion and adapted to support a rider;
    c) said channel portion adapted to receive the deck tube so that the deck may be supported on the deck tube, and wherein the channel portion of the deck features an open top through which the deck tube passes.

11. The deck of claim 10 wherein the deck is constructed of molded plastic.

12. The deck of claim 10 wherein the deck includes a first wing and a second wing with the first wing positioned on one side of the channel portion and the second wing positioned on the other side of the channel portion.

13. The deck of claim 12 wherein the wings of the deck include support ribs.

14. The deck of claim 10 wherein the deck features openings that correspond to openings in the deck tube through which fasteners may pass to secure the deck to the deck tube.

15. The deck of 10 further comprising a rear fork portion with openings that receive a rear axle for the rear wheel of the scooter.

16. An interlocking decorative clip for a vehicle having an elongated member comprising:
    a) a generally C-shaped body constructed from a semi-rigid material;
    b) a first tab extending upward from an edge of the body;
    c) a second tab extending downward from an opposing edge of the body;

d) a first recess positioned adjacent to the first tab;
e) a second recess positioned adjacent to the second tab;
f) said first tab adapted to be received within a recess of a second decorative clip positioned above the decorative clip and said first recess adapted to simultaneously receive a downward extending tab of the second decorative clip; and
g) said second tab adapted to be received within a recess of a third decorative clip positioned below the decorative clip and said second recess adapted to simultaneously receive an upward extending tab of the third decorative clip.

17. The interlocking decorative clip of claim 16 wherein each end of the body is provided with a lip to facilitate attachment of the clip to the elongated member of the vehicle.

18. The interlocking decorative clip of claim 16 wherein the body features an indentation adapted to receive a decorative sticker and further comprising a plurality of stickers so that a user may select a sticker for placement on the indentation of the decorative clip.

\* \* \* \* \*